(12) United States Patent
Schwartz et al.

(10) Patent No.: US 8,275,901 B1
(45) Date of Patent: Sep. 25, 2012

(54) METHOD AND SYSTEM TO PROGRAM PROGRAMMABLE INPUT OUTPUT (PIO) PINS VIA NON-STORAGE OF A CONTROL MESSAGE IN A CLIENT

(75) Inventors: Elliot Schwartz, Sunnyvale, CA (US); Curtis Allred, Cupertino, CA (US)

(73) Assignee: Digi International Inc., Minnetonka, MN (US)

( * ) Notice: Subject to any disclaimer, the term of this patent is extended or adjusted under 35 U.S.C. 154(b) by 1620 days.

(21) Appl. No.: 09/912,637

(22) Filed: Jul. 24, 2001

(51) Int. Cl.
*G06F 13/00* (2006.01)
(52) U.S. Cl. ...................................... 709/233
(58) Field of Classification Search .............. 709/222, 709/230, 232, 233, 223; 710/1, 2, 3, 5, 8, 710/12, 36, 65
See application file for complete search history.

(56) References Cited

U.S. PATENT DOCUMENTS 6,789,111 B1 * 9/2004 Brockway et al. ............ 709/222

OTHER PUBLICATIONS

Wikipedia, the free encyclopedia (Wikipedia) "Transmission Control Protocol" http://en.wikipedia.org/wiki/Transmission_Control_Protocol, pp. 1-11.*
Bellini G., "A Universal Infrared Remote Controller for Your Sony MD Walkman," http://web.tiscall.it/minidisc/, last update Jun. 29, 2001. 12 pp.
"Long Range Infrared Remote," http://www.boondog.com/%5Ctutorials%5Clrir%5Cmc145026.htm, last update Feb. 27, 1999, 15 pp.
Detection Systems. Inc, "Detection Systems Introduces Remote programming Software for Fire Panels," http://www.detectionsys.com/news/dspressC00828.html, last modified Aug. 31, 2000, 2 pp.
Fried. I. "Replay TV Uses Internet as Remote Control." CNET News.com. http://news.cnet.com/news/0-1006-200-2479544.html, Aug. 9. 2000. 2 pp.

* cited by examiner

*Primary Examiner* — Robert B Harrell
(74) *Attorney, Agent, or Firm* — Heimlich Law, PC; Alan Heimlich, Esq.

(57) ABSTRACT

A network comprising a server and a remote client including an input output pin is disclosed. The server and the client are connected through a Transmission Control Protocol (TCP) connection. The server controls the client input output pin, e.g., switches it on and off. The input output pin control instruction is transmitted from the server to the client. The control instruction is not stored in the client memory upon its execution.

24 Claims, 11 Drawing Sheets

METHOD AND SYSTEM TO PROGRAM PROGRAMMABLE INPUT OUTPUT (PIO) PINS VIA NON-STORAGE OF A CONTROL MESSAGE IN A CLIENT

FIELD OF INVENTION

The present invention pertains to the field of computers and networks, and in particular, to programming the programmable input output (PIO) pins.

BACKGROUND

Network architectures are generally organized as a series of layers or levels, each one built upon the one below it. The layers can be implemented either in hardware or software. The number of layers, the name of each layer, the contents of each layer, and the function of each layer differ from network to network. However, in all networks, the purpose of each layer is to offer certain services to the higher levels, shielding those layers from the details of how the offered services are actually implemented. Layer n on one device carries on a conversation with layer n on another device. The rules and conventions used in this conversation are collectively known as a layer n protocol. A protocol is thus an agreed-upon format for transmitting data between the two devices. A set of layers and protocols is called a network architecture.

FIG. 1 illustrates a network architecture including five layers. The entities comprising the corresponding layers on different devices are called peers. In other words, it is the peers that communicate using the protocol. In reality, no data is directly transferred from layer n on one device to layer n on another device. Instead, each layer passes (or tunnels) data and control information to the layer immediately below it, until the lowest layer is reached. Below layer 1 is the physical medium through which actual communication occurs. The virtual communication is shown by dotted lines and the physical communication by solid lines.

Devices that use a network architecture can be arranged such that one device acts as a server and the other device acts as a client. The prior art includes several client-server model network architectures. Two examples include the Jini® (Jini is a registered trademark of Sun Microsystems, Inc.) architecture and the Universal Plug and Play (UPnP) protocol. The device that includes the Jini® software announces itself to the network and becomes accessible to the other devices on the network to share its power and features. The Jini® software can be implemented only for devices that support the Java® (Java is a registered trademark of Sun Microsystems. Inc,) platform. Similarly, the UPnP protocol can be implemented only for devices that include an Extensible Markup Language (XML) (XML is claimed as a trademark or generic term by Massachusetts Institute of Technology, European Research Consortium for Informatics and Mathematics, and/or Keio University on behalf of the W3C. W3C® is World Wide Web Consortium (registered in numerous countries)) generator. This presents a problem because the hardware that is required to support the Java® platform or the XML generator is relatively expensive, bulky, and heavyweight. This adds to the total cost of the devices. An additional problem is presented to the impoverished devices because they do not have the resources to support such hardware.

Furthermore, to establish the client-server connection such as a Transmission Control Protocol (TCP) connection, it is often necessary for the messages to traverse one or more firewalls. This presents a problem for many client devices, especially impoverished client devices that lack the user input capabilities such as keyboards, monitors and loadable software to pull up configuration screens to properly configure the devices for communication through the firewalls.

In the prior art, an additional load is placed on the memory resources of the client devices to control the input output (I/O) pins of the client devices. An example of the I/O pins includes the I/O pins for an Integrated Circuit (IC) chip. Controlling the I/O pins includes switching the pins on and off. In the prior art, the I/O pins control program instructions are downloaded to the client. The program instructions are stored permanently in the client memory, and read and executed by the client processor. To reprogram the I/O pins, new program instructions are downloaded to the client. The old program instructions are erased from the client memory and replaced by the new program instructions. The prior art thus requires a permanent allocation of client memory space to store the I/O pins control program instructions. This can present a problem for the impoverished devices with small memory resources.

SUMMARY OF THE INVENTION

A network comprising a server and a client coupled to the server through a transmission control protocol connection is disclosed. The client includes an input output pin. The server transmits an input output pin control instruction to the client to configure the input output pin. The control instruction is not stored in a client memory upon its execution.

BRIEF DESCRIPTION OF THE DRAWINGS

The present invention is illustrated by way of example, and not limitation, in the figures of the accompanying drawings, in which like references indicate similar elements, and in which.

DETAILED DESCRIPTION

A lightweight end-to-end network architecture in which the transport layer includes a Transmission Control Protocol (TCP) connection is disclosed. The network architecture includes a TCP connection, a Hyper Text Transport Protocol (HTTP) connection, a Messages over TCP (MT) layer, a Messages over Device-initiated HTTP (MDH) layer, a multiplexing layer, and a facility layer.

The MT facilitates the tunneling of messages through the TCP connection. The MDH facilitates the tunneling of messages through the HTTP connection. An advantage of the MT connection is that it has low overhead requirements. An advantage of the MDH connection is that the HTTP connection has a high likelihood of traversing firewalls. The multiplexing layer multiplexes messages from the various facilities of the facility layer for transmission through the MT or MDH connections.

A facility of the facility layer includes a programming module to program the input output (I/O),pins of a remote client device through the connection. The I/O pins can be located on an Integrated Circuit (IC) chip of the client. Controlling the I/O pins includes switching the I/O pins on and off. A binary format message (1 or 0) can be transmitted from the server to the client to control a particular I/O pin. The I/O library of the client can receive the binary message and forward it to the client processor. The client processor can adjust the I/O pin status (on or off) according to the binary message. The binary message is not permanently stored in the client memory. Rather, it is discarded upon its execution by the processor.

The network architecture of the present invention is an end-to-end network architecture because its protocols operate on the origin and the final destination, but not on any intermediaries. The network architecture is lightweight because its protocols use binary format messages and not text format messages. The network architecture is lightweight also because it does not require a separate connection for every facility.

A machine-readable medium is understood to include any mechanism for storing or transmitting information in a form readable by a machine, for example, a computer. A machine-readable medium can include a read only memory (ROM), a random access memory (RAM), magnetic disk storage media, optical storage media, and flash memory devices. The machine-readable medium can also include electrical, optical, acoustical or other forms of propagated signals such as carrier waves, infrared signals, and digital signals.

Figure 1:
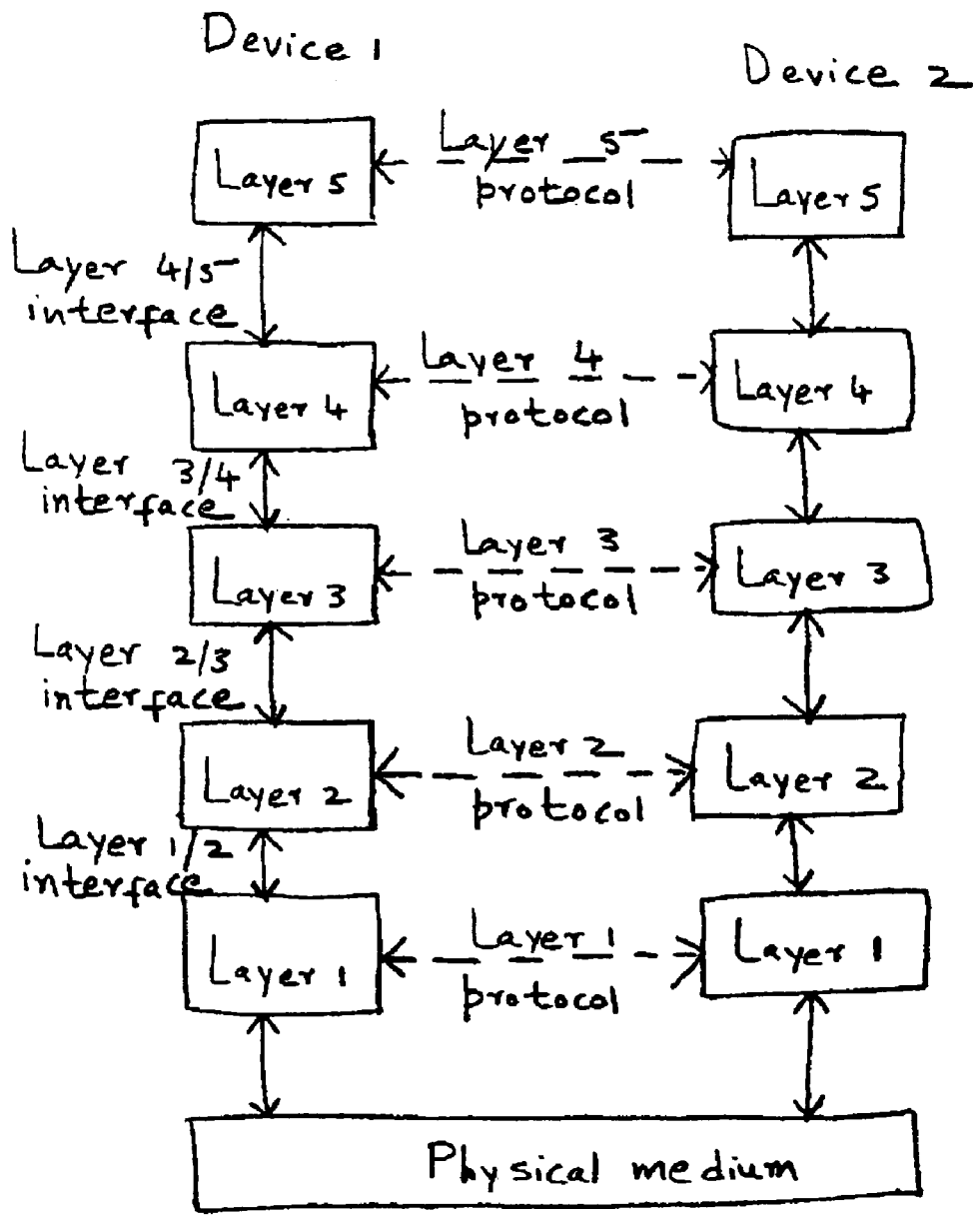
FIG. 1 illustrates an exemplary embodiment of the prior art network architecture.
Figure 2:
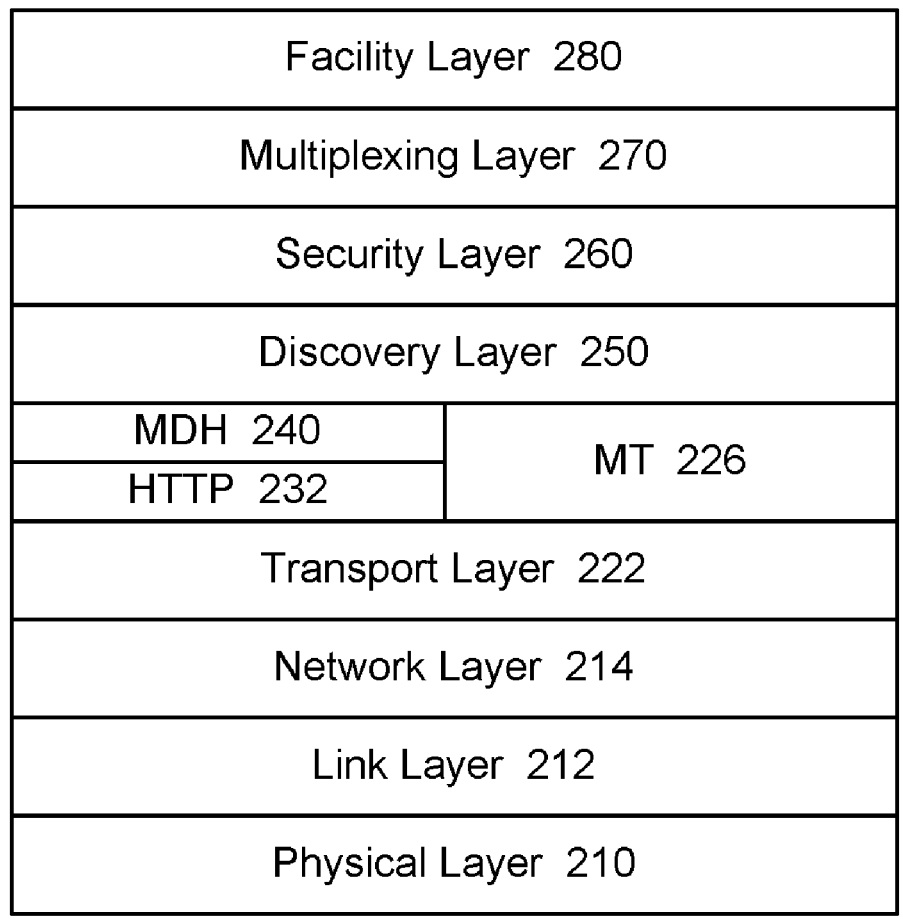
FIG. 2 illustrates an exemplary embodiment of the network architecture of the present invention.

FIG. 2 illustrates one embodiment of the lightweight end-to-end network architecture to communicate between the server and client devices. The network architecture 200 is shown to include the physical layer 210, the link layer 212 built upon the physical layer 210, the network layer 214 built upon the link layer 212 and the transport layer 222 built upon the network layer 214. The transport layer 222 can include the Transmission Control Protocol (TCP). In this description, the terms transport layer 222, TCP 222 and TCP connection 222 are used interchangeably.

In one embodiment, network architecture 200 includes the HTTP layer 232 built upon the transport layer 222 and the Message over Device-initiated HTTP (MDH) layer 240 built upon the HTTP layer 232. The discovery layer 250 is built upon the MDH layer 240. In an alternate embodiment, the Message over TCP (MT) layer 226 is built over the transport layer 222. The discovery layer 250 is built upon the MT layer 226. In this description, the term layer is used interchangeably with the protocol or connection included in the layer. For example, the terms HTTP layer 232, HTTP 232 and HTTP connection 232 are used interchangeably.

Figure 3:
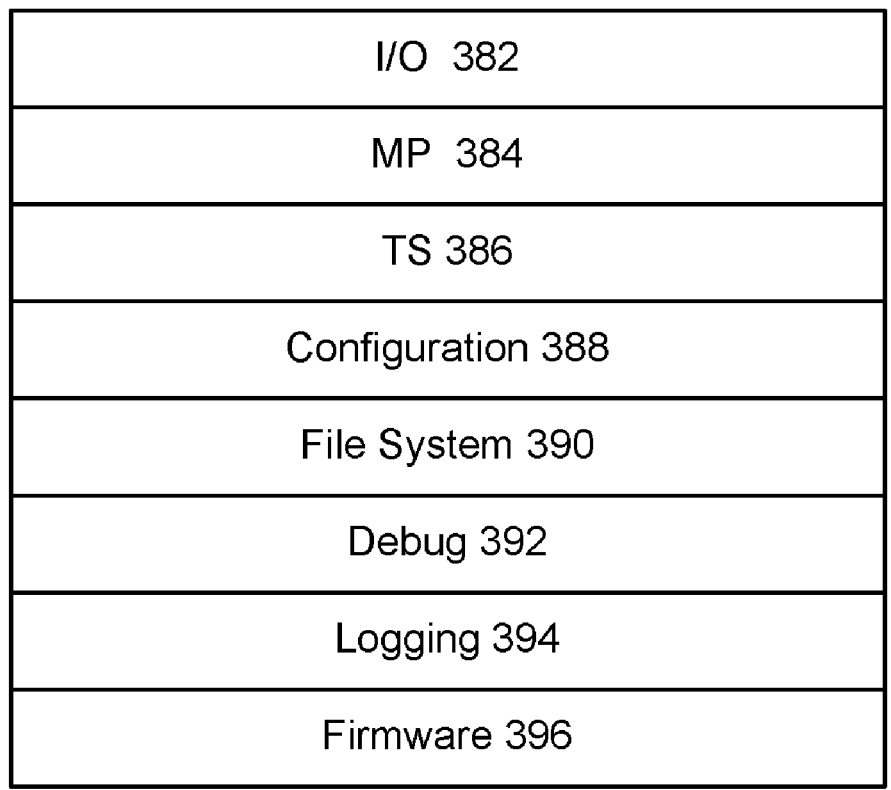
FIG. 3 illustrates an exemplary embodiment of the facility layer.

The network architecture 200 also includes the security layer 260 built upon the discovery layer 250, the multiplexing layer 270 built upon the security layer 260, and the facility layer 280 built upon the multiplexing layer 270. The facilities of the facility layer 280 are illustrated in FIG. 3. The Facility layer 280 is shown to include several facilities, each one corresponding to an independent functionality on the client. In one embodiment, the facilities include the input output (I/O) facility 382, the message passing (MP) facility 384, the transparent serial (TS) facility 386, the configuration facility 388, the file system access facility 390, the debugging facility 392, the logging facility 394 and the firmware access facility 396. In other embodiments, the facilities can include some of the above facilities 382, 384, 386, 388, 390, 392, 394, and 396. These facilities typically operate in parallel although hardware and operational restraints can prevent certain facilities from operating in parallel. For example, for the hardware with pins used either for I/O or parallel slave bus, the corresponding facilities cannot operate in parallel. For another example, when the firmware is being upgraded by the firmware access facility 396, the other facilities may not operate in parallel.

Figure 4:
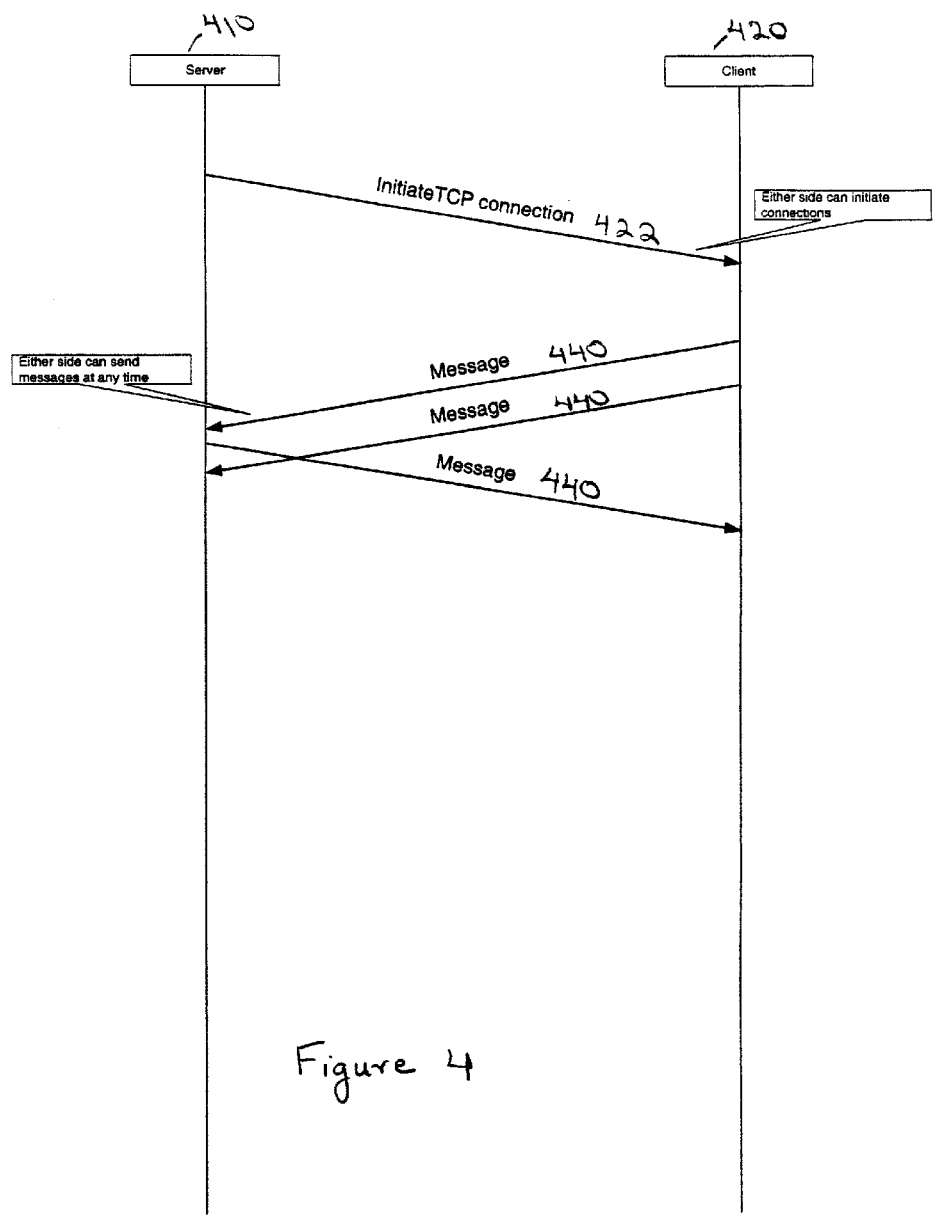
FIG. 4 illustrates an exemplary embodiment of the communications sequence diagram for the MT.

The MT 226 tunnels messages through the TCP connection 222. The messages can be exchanged between a server and a client. FIG. 4 illustrates an exemplary communications sequence diagram for the MT. Both the server 410 and the client 420 can initiate the TCP connection 222 by transmitting the TCP connection message 422. When the TCP connection 222 is established, the server 410 and the client 420 can asynchronously exchange packets 440 (also referred to as messages) through the TCP connection 222. Packets 440 of various lengths may be utilized. An advantage of the MT 226 is that it can operate with a low overhead.

The MDH 240 message includes the HTTP request (also referred to as the message) embedded within the TCP packet 440 for transmission between the server 410 and the client 420 device through the TCP connection 222. An advantage of using the MDH 240 to initiate the TCP connection 222 is that the HTTP connection 232 can traverse many firewalls that would typically block the arbitrary TCP connection 222.

Figure 5:
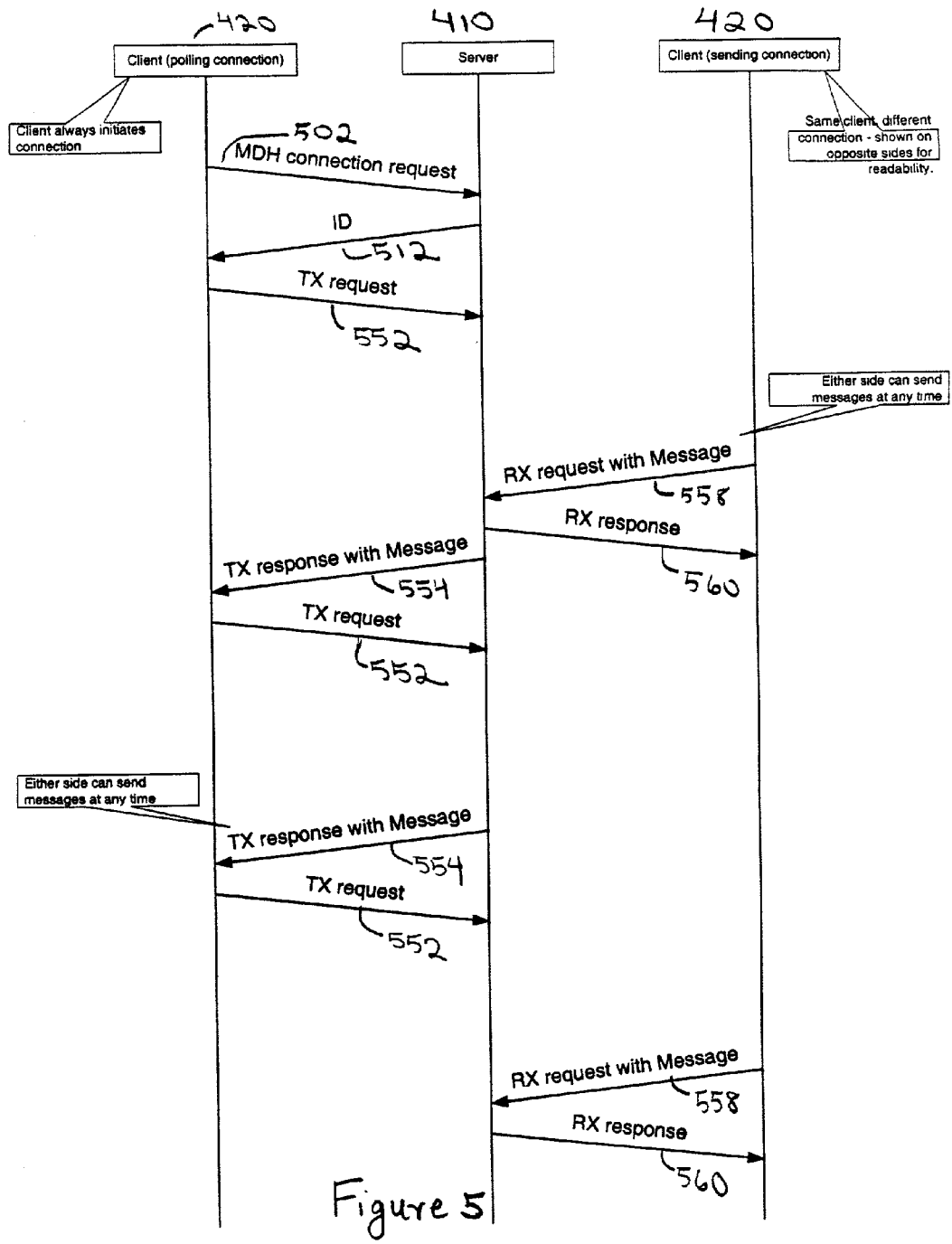
FIG. 5 illustrates an exemplary embodiment of the communications sequence diagram for the MDH.

FIG. 5 illustrates an exemplary embodiment of the communications sequence diagram for the MDH. The client 420 initiates the MDH connection 232 by transmitting a MDH connection request 502. If the connection 232 is successfully established, the server 410 transmits an identification string 512 to the client 420. This identification string 512 identifies the client 420 for the duration of the MDH connection 232.

When the connection 232 is established, it can be persistently maintained to reduce the overhead of creating HTTP connections 232. The client 420 polls the server 410 for the incoming messages from the server 410. The polling message 552 (also referred to as TX request) includes the identification string 512. The server 410 responds with a TX response message 554 that includes a code indicating whether the server 410 has messages corresponding to the client 420 in the queue. If the server 410 has messages corresponding to the client 420 in the queue, the messages are sent along with the TX response message 554. The server 410 can be configured to stall in answering a polling request 552 if no messages are available for transmission to decrease the polling overhead.

For the client 420 to transmit a message to the server 410, the client 420 can drop and reinitiate the existing HTTP connection 232 or construct a new HTTP connection 232. The client 420 transmits a separate HTTP request 232 for every message that it transmits. The client 420 transmits the RX request 558 that includes the identification string 512 followed by the data to be transmitted. The server 420 transmits the RX response 560 to acknowledge the receipt of the data.

Referring again to FIG. 2, the discovery layer 250 is shown built upon either the MT layer 226 or the MDH layer 240. The discovery layer 250 is useful because it can receive the useful and necessary data such as the client 520 parameters before the security layer 260 is activated. In one embodiment, the network architecture 200 does not include the discovery layer 250.

Figure 6:
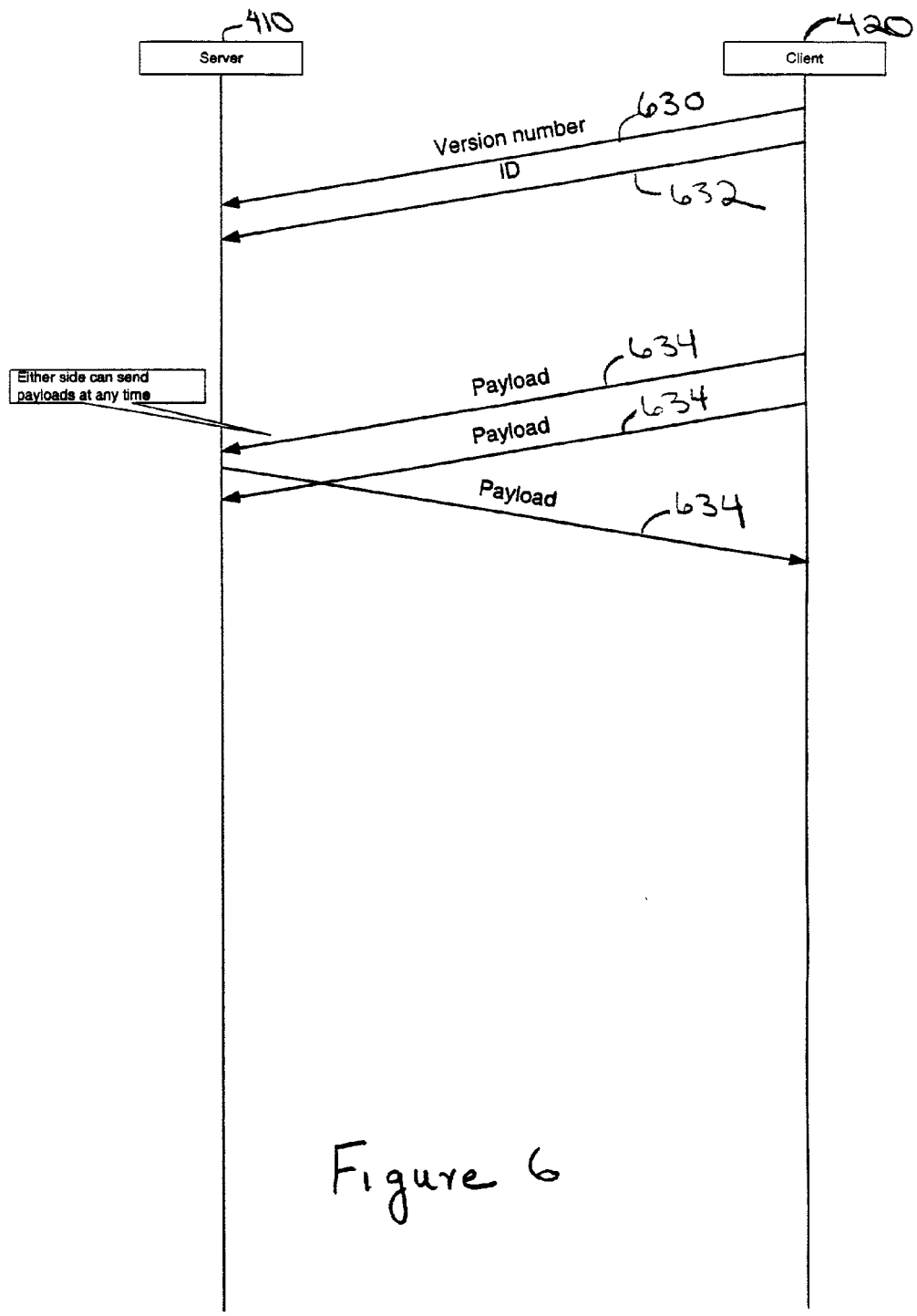
FIG. 6 illustrates an exemplary embodiment of the communications sequence diagram for the discovery layer.

FIG. 6 illustrates the exemplary embodiment of the communications sequence diagram for the discovery layer. The protocol version number message 630 informs the server 410 of the client 420 protocol version number. The device ID message 632 informs the server 410 of the client 420 device identification. The payload message 634 includes the data to be passed to the higher network architecture 200 layers for processing. It is appreciated that additional messages can be used such as a device type message that characterizes the interface of the device 420 and a destination message that describes the destination of the device 420. Initially, the client 420 transmits the protocol version number message 630 to the server 410. Next, the client 420 transmits the device ID message 632 to the server 410. Next, the payload messages 634 may be transmitted in any order between the client 420 and the server 410.

Discovery is the process by which the client 420 and the server 410 discover each other, and join is the process by which the client 420 and the server 410 establish an association between each other. Following are some examples for the discovery and join processes. For a first example, a client 420 powers up and initiates a connection to an Internet Protocol (IP) address hardwired in Read Only Memory (ROM). The server 410 at that IP address accepts the connection. The client 420 and the server 410 identify themselves and agree that the client 420 will reconnect to the server 410 within twenty-four hours. For a second example, a server 410 learns that a new client 420 has been deployed at a particular IP address. The server 410 initiates a connection to that IP address, and the client 420 accepts the connection. The client 420 and the server 410 identify themselves and determine that all future connections between them would be HTTP connections. For a third example, a client 420 powers up and utilizes a Dynamic Host Configuration Protocol (DHCP) server for its subnet. The client 420 leases an IP address, a default gateway, and a Domain Name System (DNS) server from the DHCP server. The client 420 discovers the IP address of a hard-wired domain name by utilizing the DNS server and initiates a connection. The server 410 at that IP address accepts the connection and redirects the client 420 to connect to that server 410. The client 420 connects to this new server 410 and remains connected for the remainder of the join process.

The client 420 and the server 410 are typically symmetric in their capacity to discover each other. That is, both the client 420 and the server 410 can implement identical discovery algorithms. For an impoverished client 420, however, this symmetry can be broken by the low-cost, lightweight, and transient nature of the impoverished client 420. The server 410 is typically relatively expensive and long-lived. Network firewalls and Network Address Translation (NAT) introduce additional asymmetries.

A discovery algorithm may be characterized with respect to initiative or tunneling. An active discovery algorithm has a participant initiating a network connection. Examples include communicating with well-known IP addresses, subnet broadcasting, acting as a DHCP client or a DNS client. A passive discovery algorithm has a participant listening for network connections. Examples include listening for HTTP connections, and listening for connections at application-specific ports. Tunneling includes a choice between a TCP and a User Datagram Protocol (UDP) connection, a choice of the port number (i.e. HTTP or application specific), data format, and gateway-awareness.

Referring again to FIG. 2, the security layer 260 is shown built upon the discovery layer 250. In the embodiment in which the network architecture 200 does not include the discovery layer 250, the security layer 26 is built upon the MT 226 and/or MDH 240 layers. The security layer 260 ensures that the connection between the client 420 and the server 410 is a secure connection. The security layer 260 ensures that the client 420 is aware that it is connected to the server 410, that all the data that the client 420 received was transmitted from the server 410, and that all of the data transmitted by the client 420 is readable only for the server 410. Similarly, the security layer 260 ensures that the server 410 is aware that it is connected to the client 420, that all the data that the server 410 received was transmitted from the client 420, and that all the data transmitted by the server 410 is readable only for the client 420.

The security module installed on the client 420 can operate with very little processing power if client 420 communicates only with the server 410 and no other third parties. A symmetric key system can be used and the keys can be distributed during manufacturing or a key generation protocol can be used across the network. The security layer 260 receives a variable length unencrypted message from the higher layer, e.g., 270, and produces a variable-length encrypted message for the lower layer, e.g., 250, or vice versa. The encryption algorithm used by the security layer 260 is indicated in the encryption-type field of the encrypted message. For example, the encryption field value of 0 indicates that the encryption algorithm is the plaintext algorithm.

The multiplexing layer 270 is built upon the security layer 260. The multiplexing layer 270 allows the multiple parts of the client 420 to communicate with the server 410 through a single security layer 260 and a single transport layer 222. Referring again to FIG. 3, the facility layer is shown in detail. The I/O facility 382 provides the server 410 with the ability to control the I/O pins of the client 420. The message passing (MP) facility 384 passes a variable-length message from the server 410 to a bus interface and transmits the message that arrives from the bus interface to the server 410. The transparent serial (TS) facility 386 facilitates the sending and receiving of data through a serial interface and controls the serial ports characteristics. The configuration facility 388 facilitates the adjustment of the various configuration parameters of the client 420. The file system access facility 390 reads and updates the file system for the client 420. The debugging facility 392 performs interactive (human-driven) debugging for the client 420. The logging facility 394 performs non-interactive debugging for the client 420. The firmware facility 396 updates the firmware for the client 420.

The multiplexing layer 270 provides the security layer 260 with a message including a facility code and a facility-specific message. The multiplexing layer 270 provides the facility layer 280 with a facility-specific message. The facility code is a sixteen-bit network byte order value and uniquely identifies the various facilities of the facility layer 280.

A few examples of the facilities codes represented in the hexadecimal number system include 0x0000 for the programmable I/O (PIO) facility 282, x0010 for the message passing over bus interface facility 284, 0x0020 for the transparent serial: port 0 facility 286, 0x0021 for the transparent serial: port 1 facility 286, 0x0030 for the configuration facility 288, 0x0040 for the file system access facility 290, 0x0050 for the debugging facility 292, 0x0060 for the logging facility 294 and 0x0070 for the firmware access facility 296.

Figure 7:
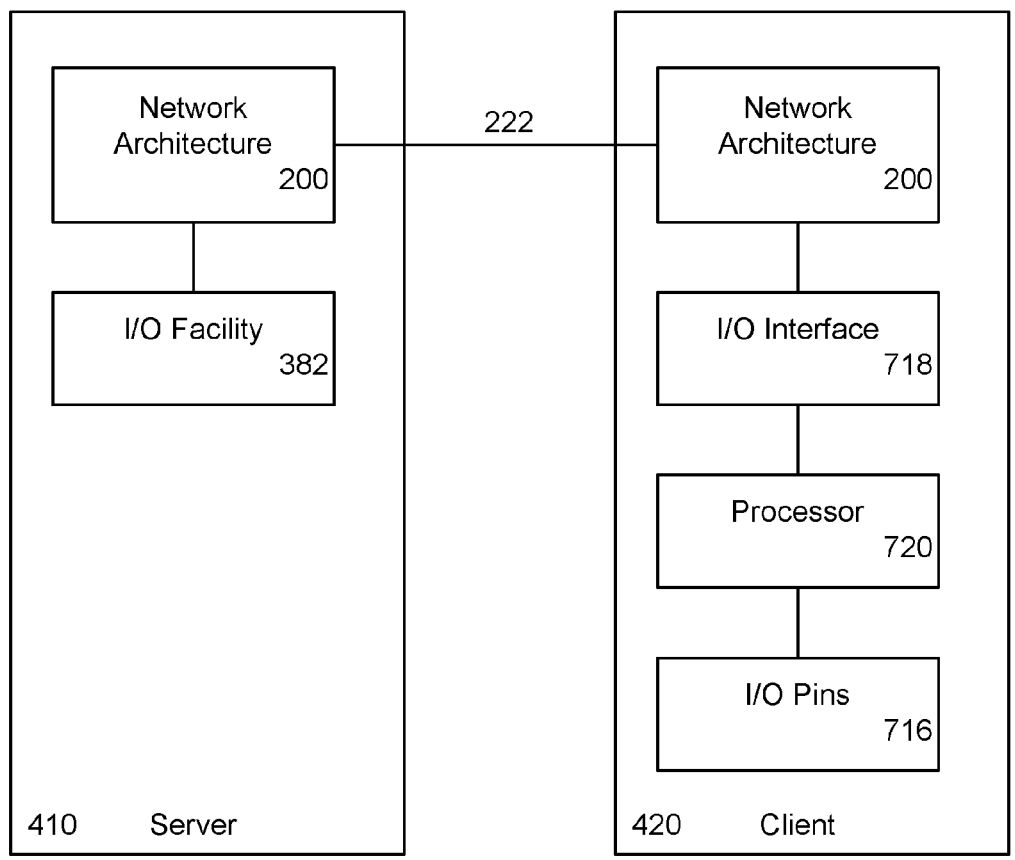
FIG. 7 illustrates an exemplary embodiment of the network to control remote I/O pins.

FIG. 7 illustrates an exemplary embodiment of the network to control remote I/O pins. The client 420 is shown connected to the server 410 through the TCP connection 222. The server 410 can include a service facility such as a Web Site, an application service provider, a search engine, or a database server. The client 420 can include traditional devices such as a personal computer and a home entertainment system, or non-traditional devices such as home appliances including a clothes washer, a dryer, a refrigerator, or an air conditioner. It is appreciated that various business models and advanced features may evolve from the capability of communication between the service facility 410 and the client 420. For example, a home appliance 420 can relay operational information, such as malfunctions, temperature, gas pressure, and operating conditions to a service facility 410 in the form of a repair web site. In this scenario, early diagnosis and preventive maintenance may be possible.

Both the client 420 and the server 410 include the implementation of the network architecture 200. The network architecture 200 is easy to deploy because it is entirely centralized because the program instruction for the I/O pins originates at the server and is not saved elsewhere. The client 420 includes the I/O pins 716 and the I/O interface 718. In one embodiment, the processor 720 interfaces to the I/O pins 716 and the I/O interface 718. The server 410 includes the I/O facility 382 to program the I/O pins 716. The I/O facility 382 can be a programming module implemented in software, firmware or hardware to transmit the I/O pins program instructions through the TCP connection 222. The program instructions are transmitted as binary format messages. The I/O interface 718 receives the program instructions and transmits them to the processor 720. The processor 720 reads and executes the program instructions. The program instructions are not permanently stored in the client 420 memory. Rather, they are discarded upon execution by the processor 720.

In another embodiment, the I/O interface 718 is coupled directly to the I/O pins 716. In this embodiment, the program instructions do not have to be tailored to the particular client 420 processor 720. The I/O interface 718 acts as the virtual processor for the program instructions, and the server 410 can transmit the program instructions regardless of the type of the real processor 720 the client 420 is using. The instructions transmitted by the server 410 are thus portable to various types of clients 420.

Figure 8:
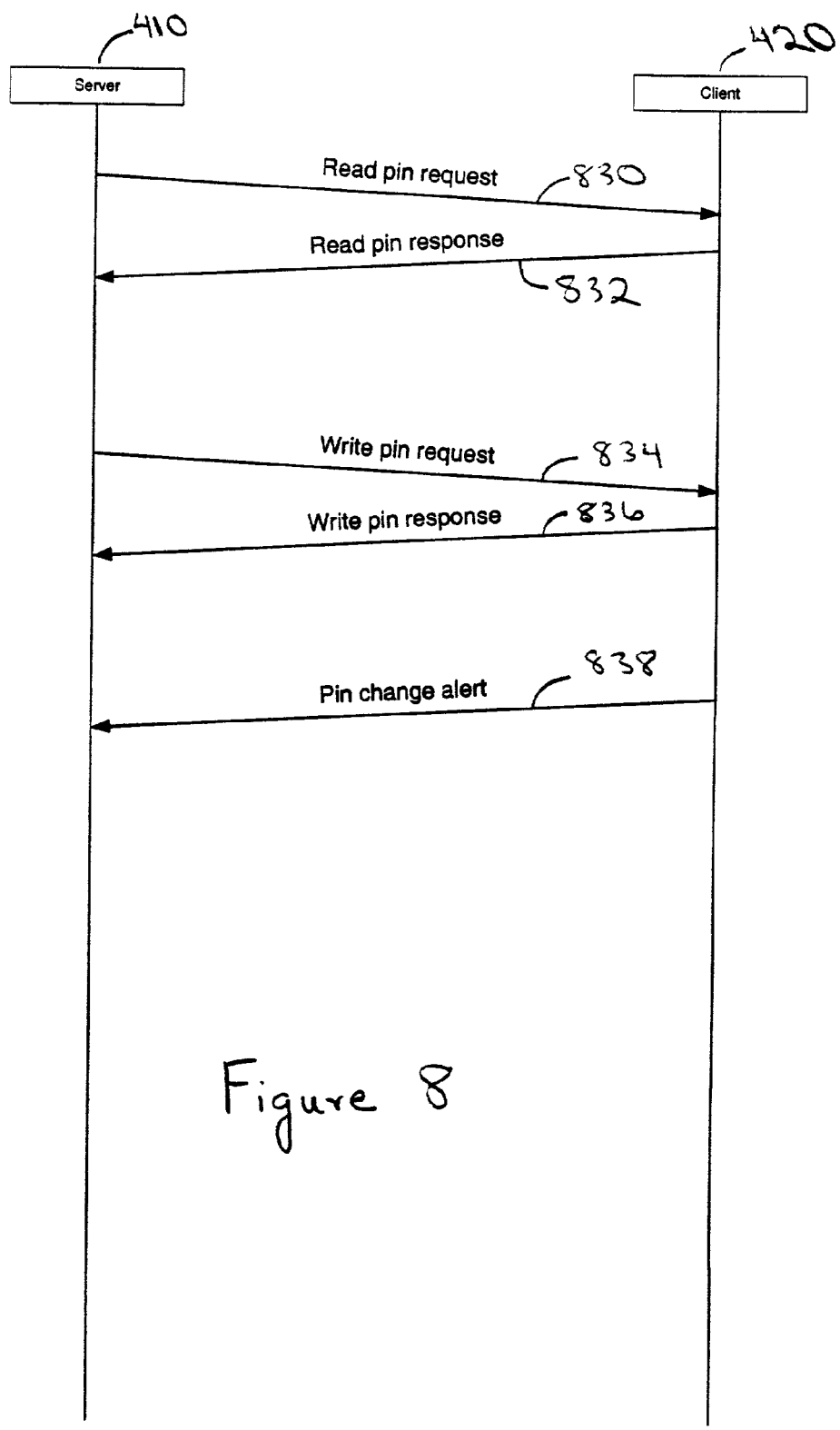
FIG. 8 illustrates an exemplary embodiment of the communications sequence diagram for the I/O facility.

FIG. 8 illustrates an exemplary communications sequence diagram for the I/O facility. The I/O facility 382 message format includes a one octet operation code and a data field. The operation code is a value that selects one operation from among a set of possible operations. This value is interpreted by a computer system to perform the selected operation. In one embodiment, five operations codes are defined for the I/O facility 382. In alternate embodiment, more operations codes can be defined.

The read pin request 830 is issued by the server 410 to the client 420. The data field included with this request 830 can include a bits mask. The number of bits in the mask corresponds to the number of I/O pins on the client. The pins to be read are those whose bits are set to 1 in the mask. An out-of-band method can be used to determine the number of pins. If the number of pins is not a multiple of eight, the extra bits at the end of the bits mask are ignored. The client 420 reads the values of the requested pins and returns a message with the read pin response message.

The data field for the read pin response 832 includes a value with the same number of bits as the I/O pins. For those bits whose values were set to 1 in the bits mask, the bits are set to the corresponding I/O pins values (0 or 1). All the other bits are set to 0.

The write pin request 834 is similar to the read pin request 830, except that the data field includes two bits masks. The first bits mask indicates the I/O pins whose values are to be modified. The second bits mask indicates the values to be written to I/O pins. Each bits mask is padded to a whole number of octets.

The write pin response 836 is generated in response to a write pin request 834. The data field for the write pin response 836 includes a value with the same number of bits as the I/O pins. For the bits whose value was modified, the bits are set to the corresponding I/O pins values (0 or 1). All the other bits are set to 0.

The client 420 issues the pin change alert 838 when the values of the input pins to the client cause the I/O pins to be set to a predetermined pattern. For example, the client 420 can issue a pin change alert 838 if all the pins of a certain pin set are set to 1. The data field of the pin change alert 838 includes two bits masks. The first bits mask indicates the input pins that caused the event. The second bits mask indicates the values of the pins that caused the event.

Figure 9:
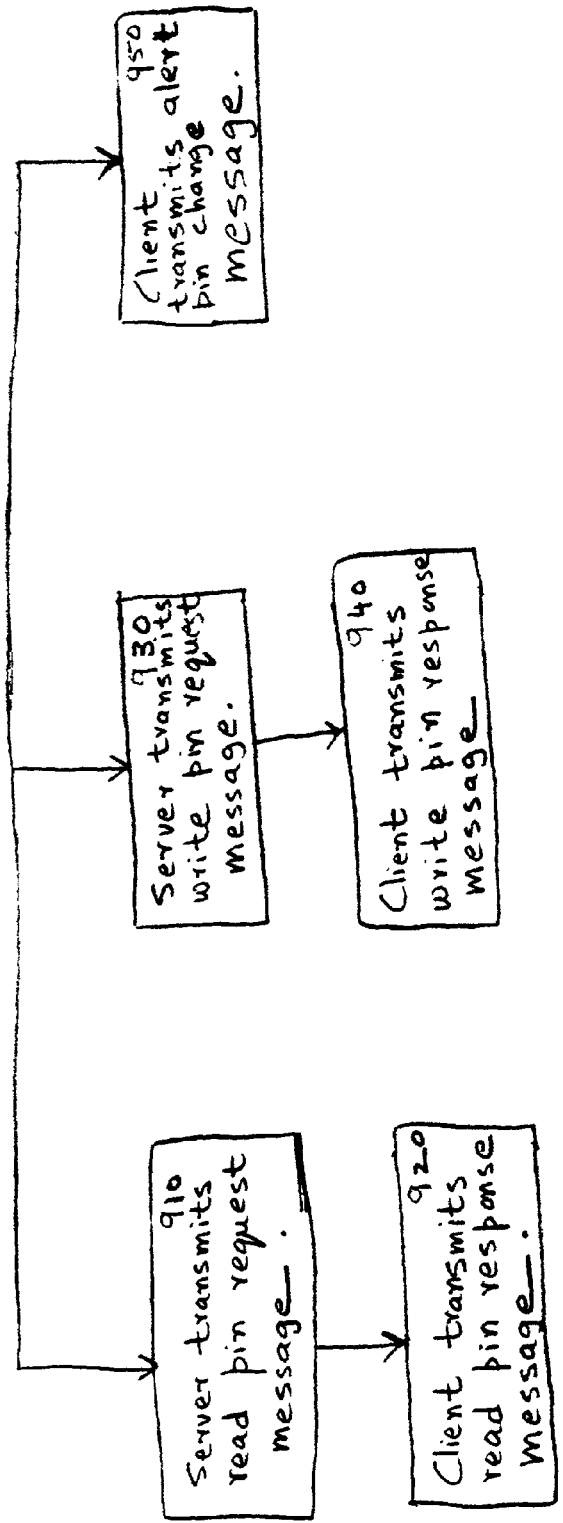
FIG. 9 illustrates an exemplary embodiment of the method to control remote I/O pins.

FIG. 9 illustrates an exemplary embodiment of the method to control remote I/O pins. At block 910, the server transmits a read pin request message to determine the values of a set of the I/O pins. At block 920, the client transmits the read pin response message responsive to the read pin request message. The read pin response message indicates the values of the set of the I/O pins. At block 930, the server transmits a write pin request message indicating the values to be written to a set of the I/O pins. At block 940, the client transmits the write pin response message responsive to the write pin request message. The write pin response message indicates the new values for the set of the I/O pins. At block 950, the client transmits a pin alert change message responsive to a set of PIO pins being set to certain values.

Figure 10:
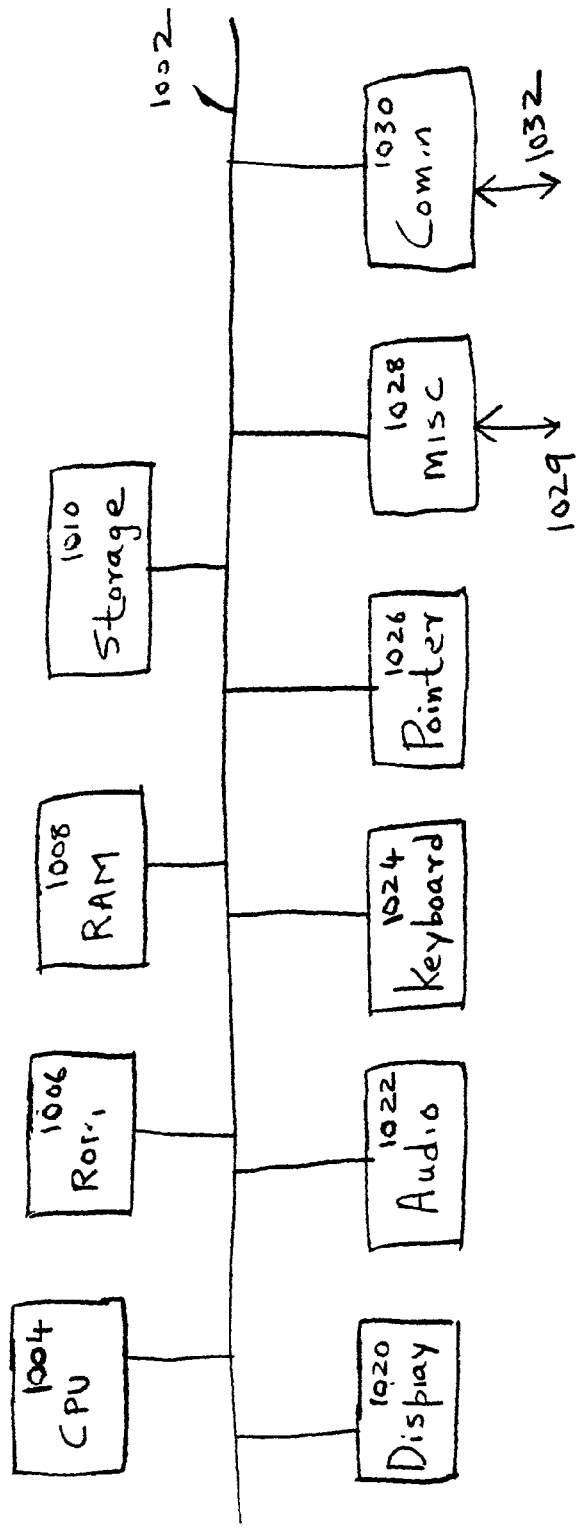
FIG. 10 illustrates a computer in block diagram form.

FIG. 10 illustrates a computer in block diagram form, which may be representative of any client or server. The block diagram is a high level conceptual representation and may be implemented in a variety of ways and by various architectures. The bus system 1002 interconnects a Central Processing Unit (CPU) 1004, a ROM 1006, a RAM 1008, storage 1010, a display 1020, an audio 1022, a keyboard 1024, a pointer 1026, miscellaneous input/output (I/O) devices 1028, and communications 1030. The bus system 1002 may be for example, one or more of such buses as a system bus, a Peripheral Component Interconnect (PCI), an Advanced Graphics Port (AGP), a Small Computer System Interface (SCSI), and an Institute of Electrical and Electronics Engineers (IEEE) standard number 1394 (Fire Wire). The CPU 1004 may be a single, multiple, or even a distributed computing resource. The CPU 1004 can include the processor 720. The ROM 1006 may be any type of non-volatile memory that may be programmable such as mask programmable and flash. The RAM 1008 may be, for example, static, dynamic, synchronous, asynchronous, or any combination. In one embodiment, the I/O facility 382 and I/O library 718 can be applications stored in the ROM 1006. In another embodiment, the I/O facility 382 and I/O library 718 can be applications stored in the RAM 1008. The storage 1010 may be a Compact Disc (CD), a Digital Versatile Disk (DVD), a hard disk, an optical disk, a tape, a flash, a memory stick or a video recorder. The display 1020 might be, for example, a Cathode Ray Tube (CRT), a Liquid Crystal Display (LCD), a projection system or a Television (TV). The audio 1022 may be a monophonic, a stereo, or a three dimensional sound card. The keyboard 1024 may be a keyboard, a musical keyboard, a keypad, or a series of switches. The pointer 1026 may be, for example, a mouse, a touch pad, a trackball, or a joystick. The I/O device 1028 might be a voice command input device, a thumbprint input device, a smart card slot, a Personal Computer Card (PC Card) interface, or a virtual reality accessory. The I/O device 1028 can be connected via an input/output port 1029 to other devices or systems. An example of a miscellaneous I/O device 1028 would be a Musical Instrument Digital Interface (MIDI) card with the I/O port 1029 connected to the musical instrument(s). The communications device 1030 might be, for example, an Ethernet adapter for a local area network (LAN) connection, a satellite connection, a set-top box adapter, a Digital Subscriber Line (xDSL) adapter, a wireless modem, a conventional telephone modem, a direct telephone connection, a Hybrid-Fiber Coax (HFC) connection, or a cable modem. The communications device 1030 can be the TCP connection 222. The external connection port 1032 may provide for any interconnection, as needed, between a remote device and the bus system 1002 through the communications device 1030. For example, the communications device 1030 might be an IEEE 802.3 (Ethernet) adapter that is connected via the connection port 1032 to, for example, an external DSL modem. It is appreciated that depending on the actual implementation of a computer system, the computer system may include some, all, more, or a rearrangement of components in the block diagram. For example, a thin client might consist of a wireless hand held device that lacks, for example, a traditional keyboard.

Figure 11:
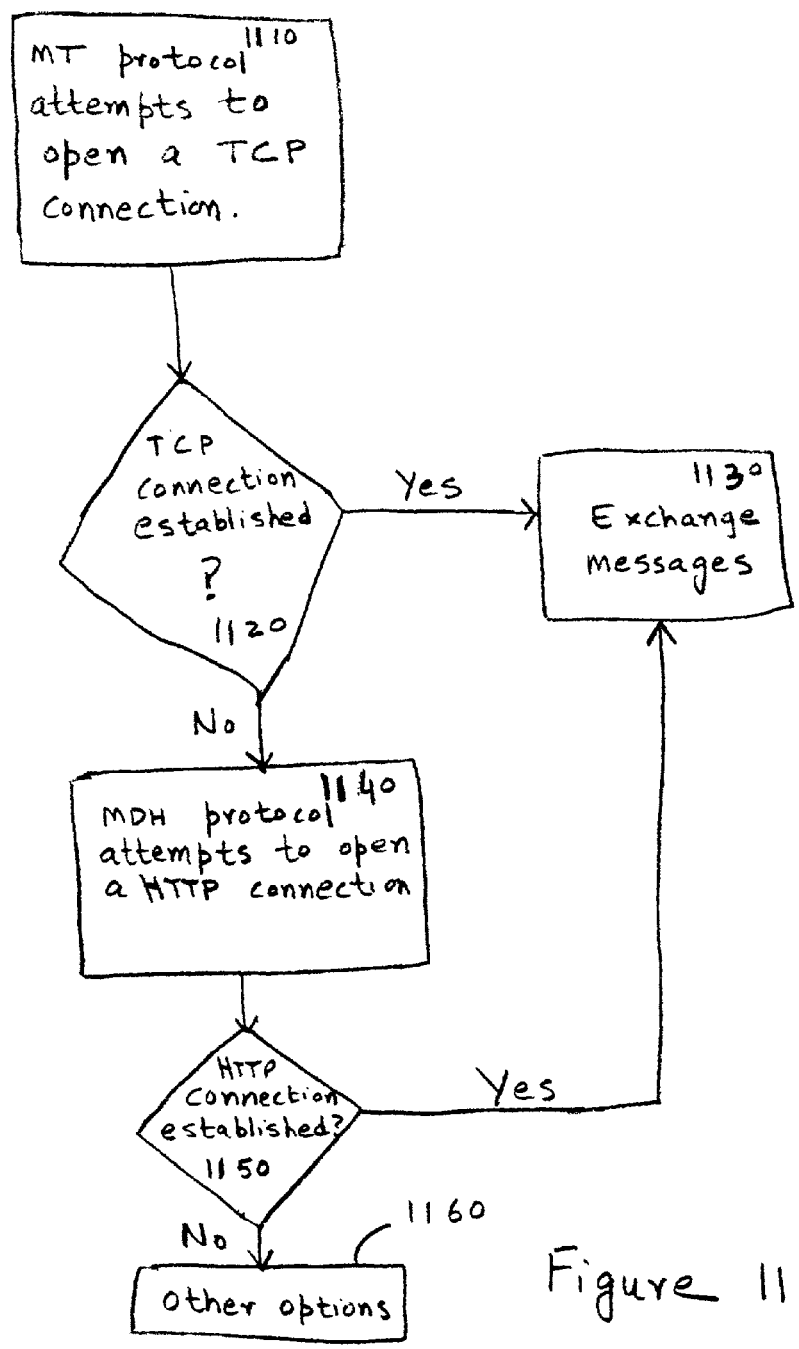
FIG. 11 illustrates an exemplary embodiment of the method to transmit a message between a client and a server.

FIG. 11 illustrates an exemplary method to transmit a message between a client and a server. At block 1110, the MT attempts to open a TCP connection between the client and the server. Both the client and the server can attempt to initiate the TCP connection using the MT protocol. If the TCP connection is established at block 1120, the client and the server can exchange messages at block 1130. If the MT is unable to open the TCP connection for reasons such as firewall blockage, at block 1140, the MDH attempts to open the TCP connection between the client and the server. The client initiates the TCP connection using the MDH. If the HTTP connection is established at block 1150, the client and the server can exchange messages at block 1130. If the MHD is unable to open the HTTP connection, at block 1160, the client and the server can try other options to open the TCP connection.

Although the present invention has been described with reference to specific exemplary embodiments, it will be evident that various modifications and changes may be made to these embodiments without departing from the broader spirit and scope of the invention as set forth in the claims. Accordingly, the specification and the drawings are to be regarded in an illustrative rather than a restrictive sense.

In addition, the methods as described above can be stored in memory of a computer system as a set of instructions to be executed. In addition, the instructions to perform the methods as described above could alternatively be stored on other forms of computer-readable mediums, including magnetic and optical disks. For example, the method of the present invention can be stored on computer-readable mediums, such as magnetic disks or optical disks that are accessible via a disk drive (or computer-readable medium drive).

What is claimed is:

1. A network comprising:
   a server;
   a client coupled to said server through a transmission control protocol connection, said transmission control protocol connection having a messages over transmission control protocol layer, said client including an input output pin; and
   said server to transmit an input output pin control instruction to said client to configure said input output pin;
   wherein said input output pin control instruction is discarded upon execution of said input output pin control instruction, and said input output pin control instruction is tunneled through said transmission control protocol connection.

2. The network of claim 1, wherein said input output pin has an on state and said input output pin has an off state and wherein said on state and said off state is configurable by said input output pin control instruction.

3. The network of claim 2, wherein said client transmits a message to said server when said input output pin is configured to a predetermined state.

4. The network of claim 1, wherein said server includes a programming module.

5. The network of claim 1, wherein said server transmits said input output pin control instruction to a client input output interface.

6. The network of claim 1, wherein a processor reads and executes said input output pin control instruction.

7. A computing system comprising:
   a controller;
   an electrical circuit capable of being coupled to said controller through a transmission control protocol connection, said transmission control protocol connection having a messages over transmission control protocol layer, said electrical circuit including an input output pin; and
   said controller capable of transmitting an input output pin control instruction to said electrical circuit to configure said input output pin;
   wherein said input output pin control instruction is discarded upon execution of said input output pin control instruction, and said input output pin control instruction is tunneled through said transmission control protocol connection.

8. The computing system of claim 7, wherein said input output pin has an on state and said input output pin has an off state and wherein said on state and said off state is configurable by said input output pin control instruction.

9. The computing system of claim 8, wherein said electrical circuit transmits a message to said controller when said input output pin is configured to a predetermined state.

10. The computing system of claim 7, wherein said controller includes a programming module.

11. The computing system of claim 7, wherein said controller transmits said input output pin control instruction to a client input output interface.

12. The computing system of claim 7, wherein a processor reads and executes said input output pin control instruction.

13. A method for a network comprising:
    coupling a client to a server by using a transmission control protocol connection, said transmission control protocol connection having a messages over transmission control protocol layer;
    transmitting an input output pin control instruction to said client by using said server; and
    configuring a client input output pin by using said input output pin control instruction;
    wherein said input output pin control instruction is discarded upon execution of said input output pin control instruction, and said input output pin control instruction is tunneled through said transmission control protocol connection.

14. The method of claim 13, including said input output pin having an on state and said input output pin having an off state and said on state and said off state being configurable by said input output pin control instruction.

15. The method of claim 14, including transmitting a message to said server by using said client when said input output pin is configured to a predetermined state.

16. The method of claim 13, including using a programming module as said server.

17. The method of claim 13, including transmitting said input output pin control instruction to a client input output interface.

18. The method of claim 13, including reading and executing said input output pin control instruction by using a processor.

19. A computer program product embodied on a tangible computer readable storage medium having instructions which, when executed by a processing system, causes said processing system to perform a process comprising:
 coupling a client to a server by using a transmission control protocol connection, said transmission control protocol connection having a messages over transmission control protocol layer;
 transmitting an input output pin control instruction to said client by using said server; and
 configuring a client input output pin by using said input output pin control instruction;
 wherein said input output pin control instruction is discarded upon execution of said input output pin control instruction, and said input output pin control instruction is tunneled through said transmission control protocol connection.

20. The tangible computer readable storage medium of claim 19, including said input output pin having an on state and said input output pin having an off state and said on state and said off state being configurable by said input output pin control instruction.

21. The tangible computer readable storage medium of claim 20, including transmitting a message to said server by using said client when said input output pin is configured to a predetermined state.

22. The tangible computer readable storage medium of claim 19, including using a programming module as said server.

23. The tangible computer readable storage medium of claim 19, including transmitting said input output pin control instruction to a client input output interface.

24. The tangible computer readable storage medium of claim 19, including reading and executing said input output pin control instruction by using a processor.

* * * * *